(12) United States Patent
Sakurada et al.

(10) Patent No.: US 11,607,831 B2
(45) Date of Patent: Mar. 21, 2023

(54) INJECTION DEVICE (71) Applicant: NISSEI PLASTIC INDUSTRIAL CO., LTD., Nagano-ken (JP)

(72) Inventors: Yuichi Sakurada, Nagano-ken (JP); Nanae Naito, Nagano-ken (JP); Keita Arai, Nagano-ken (JP); Hozumi Yoda, Nagano-ken (JP); Hirofumi Murata, Nagano-ken (JP)

(73) Assignee: NISSEI PLASTIC INDUSTRIAL CO., LTD.

( * ) Notice: Subject to any disclaimer, the term of this patent is extended or adjusted under 35 U.S.C. 154(b) by 0 days.

(21) Appl. No.: 17/266,767

(22) PCT Filed: Mar. 28, 2019

(86) PCT No.: PCT/JP2019/013495
§ 371 (c)(1),
(2) Date: Feb. 8, 2021

(87) PCT Pub. No.: WO2020/044642
PCT Pub. Date: Mar. 5, 2020

(65) Prior Publication Data
US 2021/0308921 A1    Oct. 7, 2021

(30) Foreign Application Priority Data

Aug. 29, 2018    (JP) .............................. JP2018-159954

(51) Int. Cl.
*B29C 45/74* (2006.01)
*B29C 45/18* (2006.01)
*B29C 45/62* (2006.01)

(52) U.S. Cl.
CPC .............. *B29C 45/74* (2013.01); *B29C 45/18* (2013.01); *B29C 45/62* (2013.01)

(58) Field of Classification Search
CPC ......... B29C 45/74; B29C 45/18; B29C 45/62; B29C 45/50; B29C 2045/1875
See application file for complete search history.

(56) References Cited

U.S. PATENT DOCUMENTS

| 1,938,377 A | * | 12/1933 | Banbury | ................. B29B 7/246 |
| | | | | 366/147 |
| 3,114,171 A | * | 12/1963 | Colombo | .............. B29C 48/767 |
| | | | | 100/339 |

(Continued)

OTHER PUBLICATIONS

International Search Report dated Jun. 11, 2019 in International Application No. PCT/JP2019/013495 together with English language machine translation thereof.

(Continued)

*Primary Examiner* — Galen H Hauth
(74) *Attorney, Agent, or Firm* — Adams & Wilks (57) ABSTRACT

An injection device has a screw disposed in a heating cylinder so as to be rotatable and movable in an axial direction. An injection stage supports the heating cylinder. A material supplying unit supplies a resin material to the heating cylinder. A material introducing member is disposed between the material supplying unit and the heating cylinder and introduces the resin material from the material supplying unit to the heating cylinder, The material introducing member has a cylindrical portion fitted in a vertical hole provided in the injection stage, and a lower part of the cylindrical portion is in abutting contact with the heating cylinder. A heat medium passage extends inside a sidewall of the cylindrical portion for flowing therethrough a temperature-controlled heat medium, and a heat-insulating air space is formed between an outer circumferential surface of the cylindrical portion and a circumferential surface of the vertical hole.

16 Claims, 9 Drawing Sheets

(56) References Cited

U.S. PATENT DOCUMENTS

| | | | | |
|---|---|---|---|---|
| 5,460,507 A | * | 10/1995 | Takatsugi | B29C 45/58 |
| | | | | 264/328.14 |
| 2004/0258786 A1 | * | 12/2004 | Senda | B29C 45/78 |
| | | | | 425/143 |
| 2009/0267253 A1 | * | 10/2009 | Fitzpatrick | B29B 13/022 |
| | | | | 425/149 |

OTHER PUBLICATIONS

English-language machine translation of Japanese Publication No. 2004-160681, publication date Jun. 10, 2004.
English-language machine translation of Japanese Publication No. 2006-315337, publication date Nov. 24, 2006.

* cited by examiner

INJECTION DEVICE

TECHNICAL FIELD

The present disclosure relates to an injection device that injects a resin material to a cavity of a metal mold.

BACKGROUND ART

An injection molding apparatus includes a mold clamping device that clamps a metal mold, and an injection device that injects a resin material to the metal mold having undergone the mold clamping.

The major components of the injection device are a heating cylinder, a screw, and a hopper. A resin material is introduced from the hopper to the heating cylinder, is kneaded by the screw so as to be deformable, and is injected by the movement of the screw in the axial direction.

In recent years, a structure in which a preheated resin material is supplied to the hopper is becoming popular. It is not preferable that the preheated resin material is cooled during an introducing process from the hopper to the heating cylinder.

Hence, an injection device that can keep the resin material at an appropriate temperature during the introducing process has been proposed (see, for example, Patent Document 1).

The major components of the injection device disclosed in Patent Document 1 will be described with reference to FIG. 9.

Figure 9:
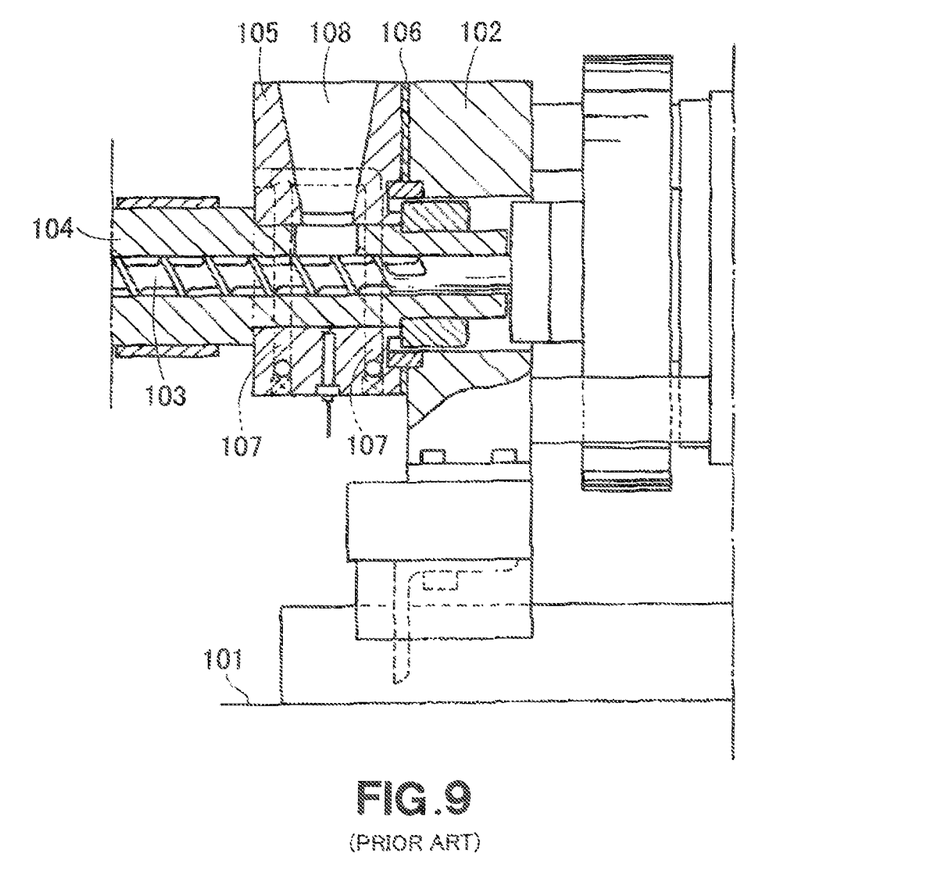
FIG. 9 is a cross-sectional view of the major components of a conventional injection device.

As illustrated in FIG. 9, a support mount 102 is placed on a base stage 101 so as to be movable horizontally.

A supply block 105 is engaged with the tail portion of a heating cylinder 104 provided with a screw 103. This supply block 105 is fastened to the support mount 102 by bolts.

A heat insulating member 106 is held between the supply block 105 and the support mount 102.

Moreover, the supply block 105 includes a temperature control flow channel 107. The supply block 105 is kept at a predetermined temperature by the flow of a heat medium at an appropriate temperature through this temperature control flow channel 107. Although the resin material passes through a droplet opening 108, the resin material is kept at an appropriate temperature during this passing process.

Meanwhile, the temperature of the support mount 102 is similar to the ambient temperature. Hence, the support mount 102 becomes a low temperature in winter.

Although the heat insulating member 106 has an excellent heat insulation performance, it allows a certain amount of heat to pass. In addition, the amount of passing heat is proportional to the area of the heat insulating member 106. Moreover, the heat of the supply block 105 is actively transferred to the support mount 102 through the bolts.

Consequently, the supply block 105 is cooled by the support mount 102, making it difficult for the injection molding apparatus to manage the temperature of the supply block 105.

In recent times and in future in which the further strict temperature control is required in comparison with conventional technologies, an injection device is desirable which accomplishes a better heat insulation performance than that of the technology disclosed in Patent Document 1.

CITATION LIST

Patent Literatures

[Patent Document 1] JP 2004-160681 A

SUMMARY OF INVENTION

Technical Problem

An objective of the present disclosure is to provide an injection device that is further suitable for a preheated resin material.

Solution to Problem

An injection device according to a first example embodiment includes:
  a heating cylinder;
  a screw placed in the heating cylinder so as to be rotatable and movable in an axial direction;
  an injection stage supporting the heating cylinder;
  a material supplying unit that supplies a resin material to the heating cylinder; and
  a material introducing member which is placed between the material supplying unit and which introduces the resin material from the material supplying unit to the heating cylinder.

The material introducing member includes a first heat medium passage through which a heat medium having undergone a temperature control passes, and is fitted in a vertical hole formed in the injection stage from an upper side.

The material introducing member includes a cylindrical portion that extends along the vertical hole.

A heat insulating air layer with a predetermined thickness is ensured between an outer circumference of the cylindrical portion and a surface of the vertical hole, and a lower part of the cylindrical portion is in contact with the heating cylinder.

According to a second example embodiment, in the injection device according to the first example embodiment:
  the injection stage is a cast component;
  the material introducing member is a cutting-and-machining component formed by cutting and machining from a metal block; and
  a recess that ensures the heat insulating air layer is formed in the cutting-and-machining component.

According to a third example embodiment, in the injection device according to the first example embodiment, the injection stage includes a second heat medium passage through which the heat medium having undergone the temperature control passes.

According to a fourth example embodiment, in the injection device according to the first example embodiment:
  the injection stage is formed in a box shape that has a front wall portion and a rear wall portion;
  a tail portion of the heating cylinder is supported by the front wall portion and by the rear wall portion; and
  in a space between the front wall portion and the rear wall portion, a temperature detector, a heater and a cooling jacket are attached to the tail portion of the heating cylinder.

According to a fifth example embodiment, in the injection device according to the fourth example embodiment:
  the tail portion of the heating cylinder is supported by the rear wall portion through a component that has a lower heat transfer rate than a heat transfer rate of the injection stage;
  the tail portion of the heating cylinder is fastened to the front wall portion by a bolt through a ring member provided with a bolt hole; and a heat insulating member is held between the ring member and the front wall portion.

According to the sixth example embodiment, in the injection device according to any one of the first to fifth example embodiment:

the cylindrical portion comprises a flange portion at an upper part; and a gasket that has a lower heat transfer rate than a heat transfer rate of the injection stage is held between the flange portion and the injection stage.

Advantageous Effects of Invention

According to the first example embodiment of the present disclosure, the material introducing member has the cylindrical portion that is a major component, the cylindrical portion is separated from the injection stage by the heat insulating air layer, and the lower part of the cylindrical portion is in contact with the heating cylinder.

In the injection stage and in the material introducing member, the most part of the material introducing member is separated from the injection stage. Hence, an adverse effect due to heat from the injection stage hardly acts on the material introducing member. Consequently, the material introducing member is easily maintained at an appropriate temperature. Moreover, since the material introducing member is in contact with the heating cylinder through the lower part of the cylindrical portion, passive heat exchange with the heating cylinder occurs.

Hence, according to the present disclosure, an injection device that is further suitable for a preheated resin material is provided.

According to the second example embodiment of the present disclosure, the material introducing member is a cutting-and-machining component formed by cutting and machining from a metal block, and a recess that ensures the heat insulating air layer is formed in the cutting-and-machining component. The recess can be easily formed in the cutting-and-machining component. In contrast, although the injection stage is a cast component, by making complicated machining processes concentrated to the material introducing member, complicated machining processes to the injection stage are unnecessary.

According to the third example embodiment of the present disclosure, the injection stage includes a second heat medium passage through which the heat medium having undergone the temperature control passes. By executing a temperature control on the injection stage that has a large thermal mass (heat capacity), an adverse effect due to heat to the material introducing member can be further reduced.

According to the fourth example embodiment of the present disclosure, the injection stage is formed in a box shape.

Since it is in a box shape, the thermal mass of the injection stage can be reduced.

Since it is in a box shape, weight saving of the injection stage can be achieved while the rigidity is maintained. In addition, the temperature detector, the heater, and the cooling jacket are put in and out through the opening in the upper part of the box, the maintenance and inspection thereof can be facilitated.

According to the fifth example embodiment of the present disclosure, the tail portion of the heating cylinder is supported by the rear wall portion through a component that has a lower heat transfer rate than a heat transfer rate of the injection stage. Moreover, the heat insulating member is held between the ring member and the front wall portion.

Heat insulation is achieved by the component that has a low heat transfer rate and by the heat insulating member.

According to the sixth example embodiment of the present disclosure, a gasket that has a low heat transfer rate is held between the flange portion and the injection stage. Heat insulation between the material introducing member and the injection stage is achieved by the gasket.

DESCRIPTION OF EMBODIMENTS

Embodiments of the present disclosure will be described below with reference to the accompanying figures.

Embodiments

Figure 1:
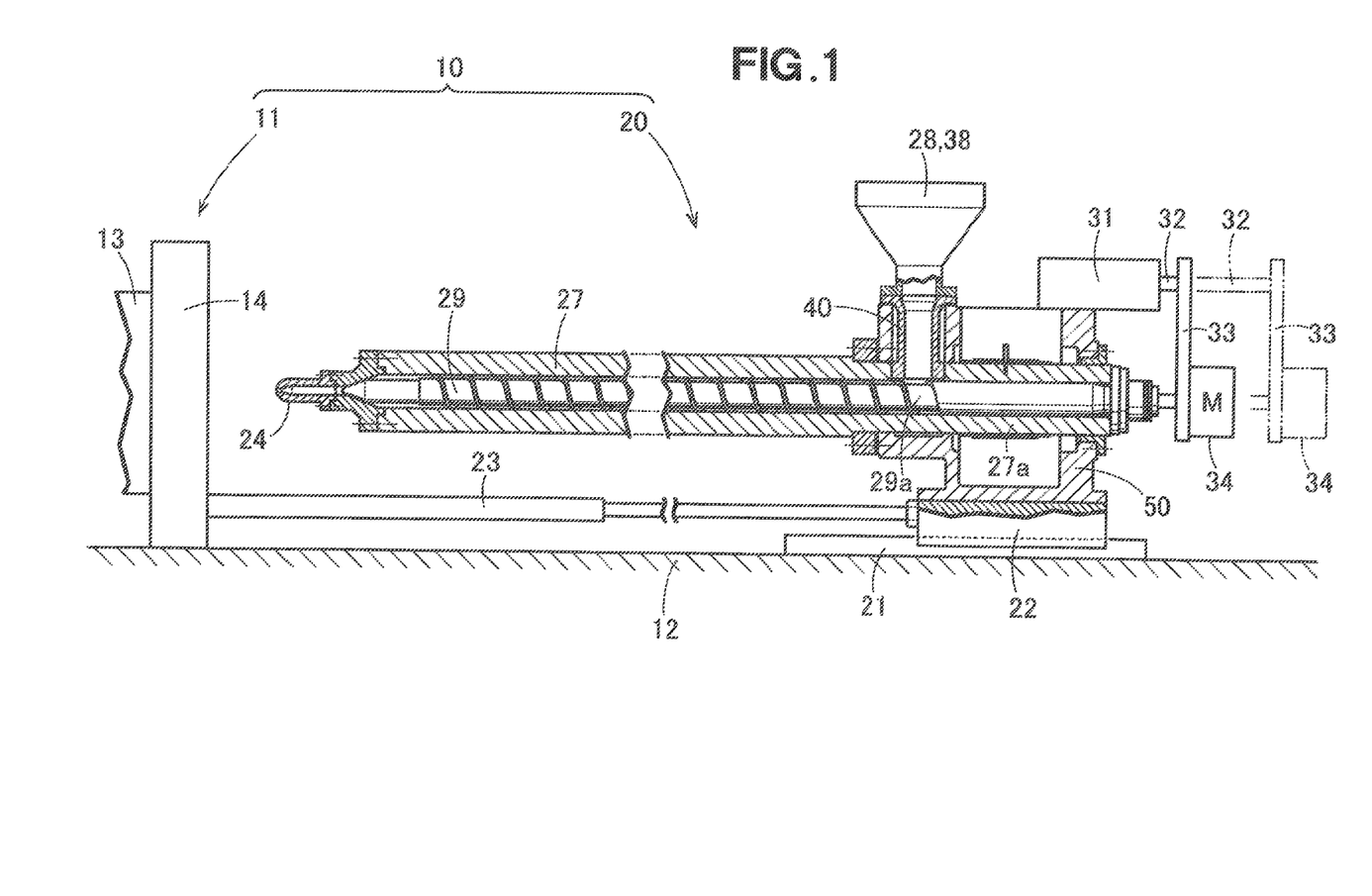
FIG. 1 is a side view of an injection molding apparatus.

As illustrated in FIG. 1, an injection molding apparatus 10 includes major components that are a mold clamping device 11, an injection device 20, and a bed 12 which supports the mold clamping device 11 and the injection device 20.

The mold clamping device 11 is a device that clamps a metal mold 13, and a part (stationary mount 14) of such a device is illustrated for the purpose of facilitating understanding to the present disclosure through the figure.

The injection device 20 is supported so as to be movable horizontally by a movable stage 22 supported by a rail 21 laid over on the bed 12. For example, a nozzle 24 is moved back and forth between a position touching the metal mold 13 and a position sufficiently apart from the metal mold 13 (the position illustrated in the figure) by an injection device moving cylinder 23 that is connected to the movable stage 22 and to the stationary mount 14 of the mold clamping device 11.

A hydraulic cylinder, and an electric cylinder, etc., can be applied for the injection device moving cylinder 23.

The injection device 20 includes an injection stage 50 supported by the movable stage 22, a heating cylinder 27 supported by the injection stage 50, a material supplying unit 28 that supplies a resin material to the heating cylinder 27, a screw 29 placed in the heating cylinder 27 so as to be rotatable and movable in the axial direction, a screw moving cylinder 31 attached to the injection stage 50, a moveable plate 33 supported by a piston rod 32 of the screw moving cylinder 31, and a screw rotating mechanism 34 which is supported by the movable plate 33 and which rotates the screw 29.

An example material supplying unit 28 is a hopper 38.

A hydraulic cylinder or an electric cylinder is applicable as the screw moving cylinder 31.

An electric motor or a hydraulic motor is applicable as the screw rotating mechanism 34.

Plasticization and Measurement Process

The resin material is supplied to the heating cylinder 27 from the material supplying unit 28 while the screw rotating mechanism 34 is rotating the screw 29 in a predetermined direction. The resin material moves in the heating cylinder 27 to the nearby location to the nozzle 24 along a first groove 29a on the screw 29 and a groove subsequent to the first groove 29a. The resin material is plasticized during this movement, and the plasticized resin material is accumulated at the front section of the heating cylinder 27. The screw 29 is retracted (moves so as to be apart from the nozzle 24) by the reaction force of the accumulated resin material. When the screw 29 is retracted to a predetermined position, the screw 29 stops rotating. Hence, plasticization and measurement are performed.

Injection Process

With the nozzle 24 touching the metal mold 13, the screw 29 is moved forward by the screw moving cylinder 31. This forward movement causes the resin material to be injected through the nozzle 24 into the metal mold 13.

According to the present disclosure, a material introducing member 40 that introduces the resin material from the material supplying unit 28 to the heating cylinder 27 is placed between the material supplying unit 28 and the heating cylinder 27.

Figure 2:
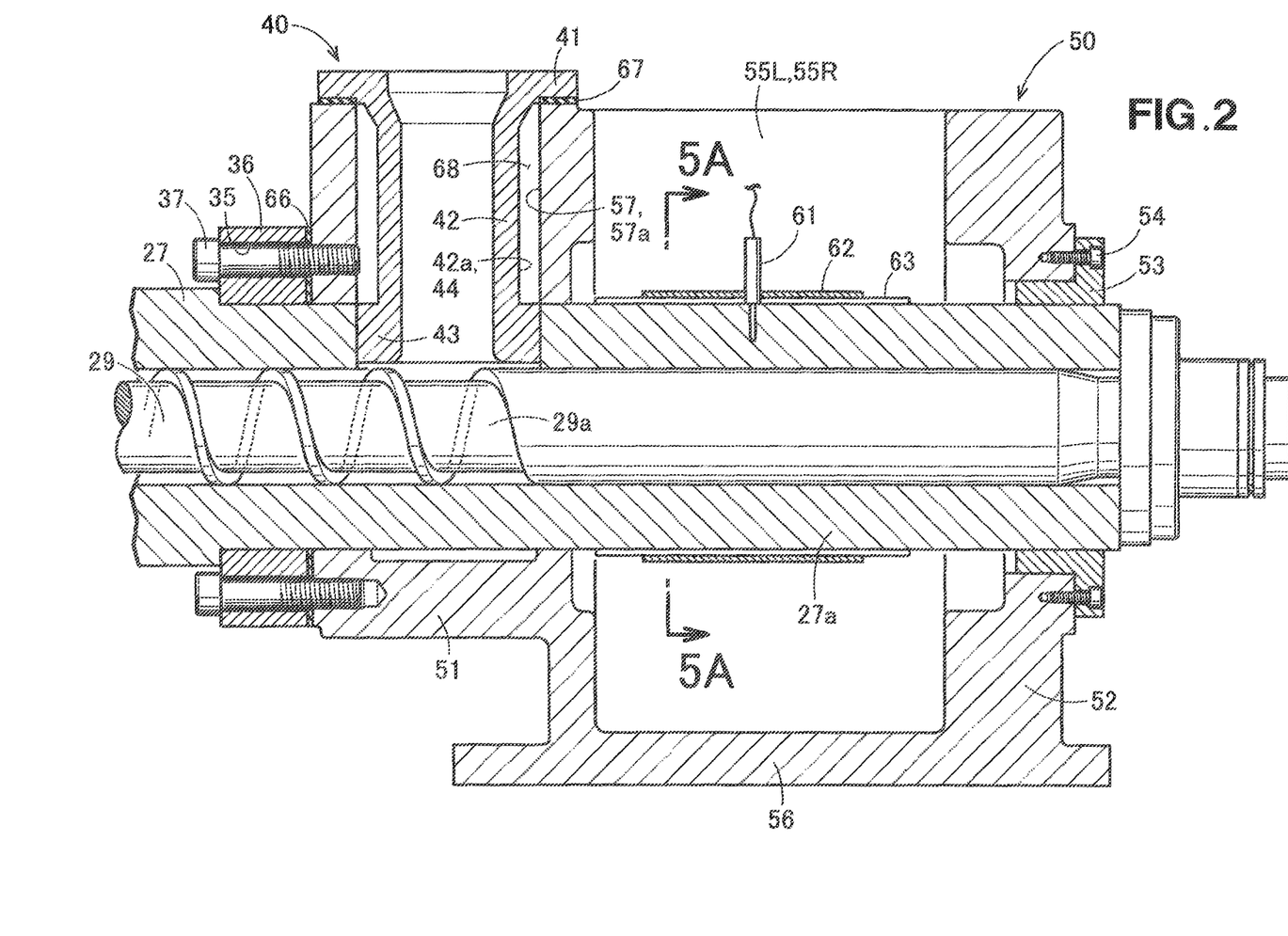
FIG. 2 is a cross-sectional view illustrating major components of an injection device according to the present disclosure in an enlarged view.

As illustrated in FIG. 2, the material introducing member 40 includes a flange portion 41 which is mounted on the injection stage 50 and which supports the material supplying unit (see FIG. 1, reference numeral 28), a cylindrical portion 42 extended downwardly from the flange portion 41, and a collar portion 43 which is projected from the cylindrical portion 42, and which contacts the heating cylinder 27.

The heating cylinder 27 is fastened to a front wall portion 51 of the injection stage 50 that is a housing in a box shape by a ring member 36 provided with bolt holes 35 and by bolts 37. Moreover, the heating cylinder 27 is fastened to a rear wall portion 52 of the injection stage 50 by a component 53 having an L-shaped cross section, and bolts 54.

The component 53 with an L-shaped cross section may be a component that has a lower heat transfer rate than that of the injection stage 50, and the cross-sectional shape can be changed as appropriate in addition to the L-shape.

Figure 3:
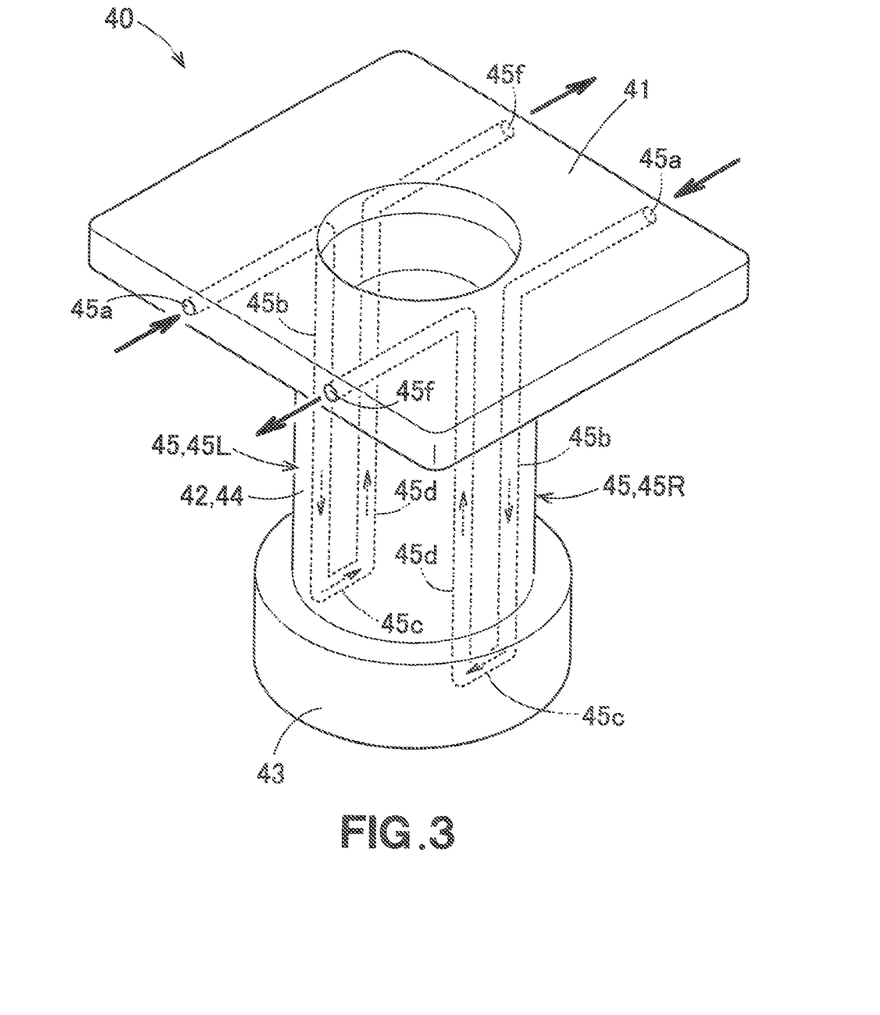
FIG. 3 is a perspective view of a material introducing member.

As illustrated in FIG. 3, the material introducing member 40 includes the flange portion 41, the cylindrical portion 42, and the collar portion 43, and a vertical recess 44 is formed between the collar portion 43 and the flange portion 41. Although the illustration is omitted, it is appropriate if bolt holes or screw holes to fasten the material supplying unit (see FIG. 1, reference numeral 28) should be provided in the flange portion 41.

Furthermore, the material introducing member 40 includes a first heat medium passage 45 through which a heat medium having undergone a temperature control flows. For example, the first heat medium passage 45 includes a left passage 45L (L indicates the left side), and a right passage 45R (R indicates the right side).

The left passage 45L and the right passage 45R each include a medium inlet 45a provided in the flange portion 41, a downflow passage 45b that goes down in the cylindrical portion 42, a horizontal passage 45c provided in the collar portion 43, an upflow passage 45d that goes up in the cylindrical portion 42, and a medium outlet 45f provided in the flange portion 41. Note that an exchange of the inlet and the outlet, and a change in the structure of the passage can be made as appropriate.

The material introducing member 40 is kept at a substantially equal temperature to the heat medium having undergone the temperature control by such a first heat medium passage 45.

Since the material introducing member 40 employs a complicated structure, a cutting-and-machining component from a metal block is adopted. The recess 44 to form a heat insulating air layer in the cutting-and-machining component is formed by cutting and machining.

Although an inexpensive carbon-steel block is suitable for the metal block, when a corrosion resistance is necessary, a block formed of a metal with a corrosion resistance is adopted. Alternatively, plating may be performed on a cutting-and-machining component from a carbon-steel block to enhance a corrosion resistance. Hence, the kind of metal is not limited to a particular kind.

Figure 4:
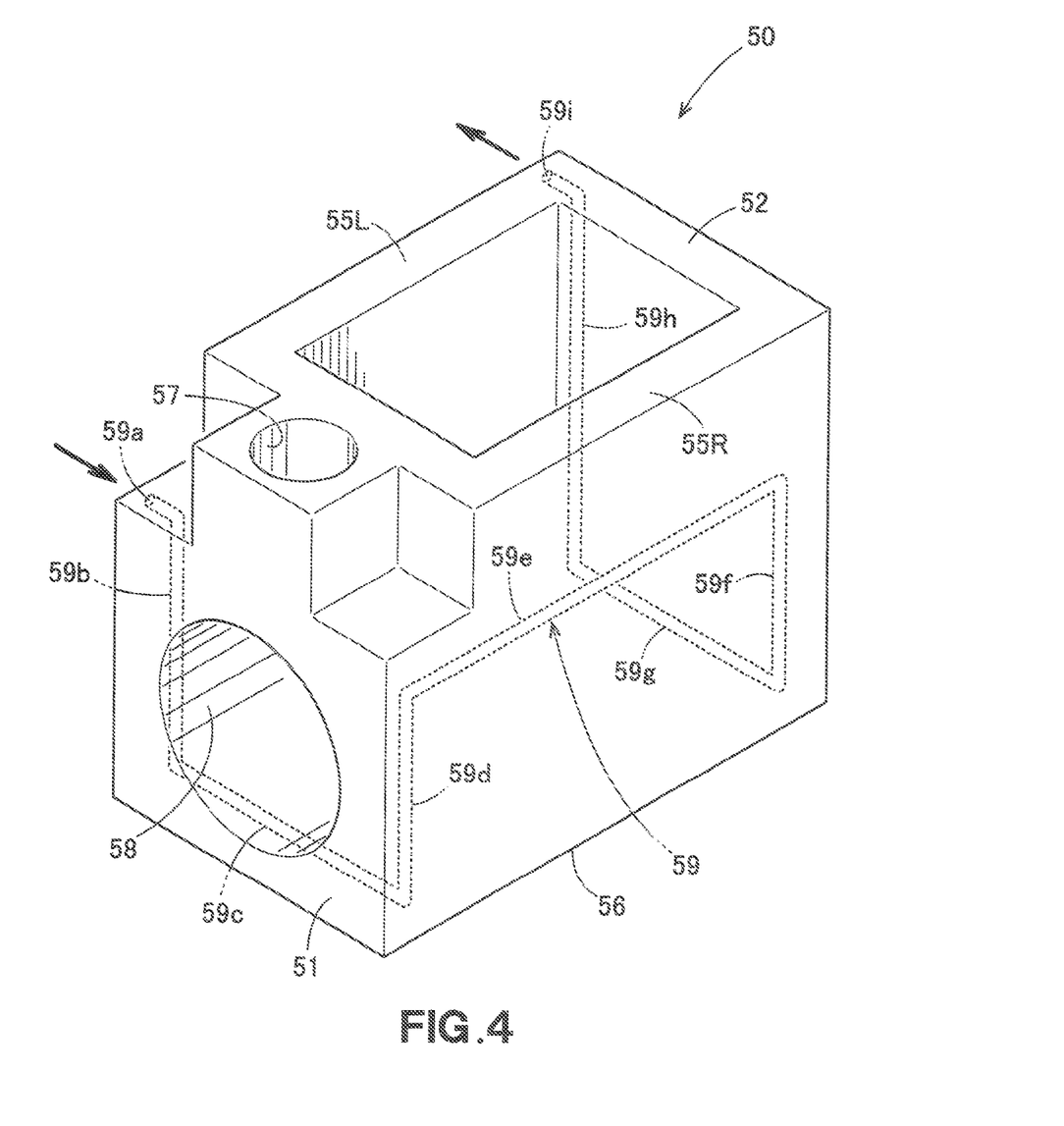
FIG. 4 is a perspective view of an injection stage.

As illustrated in FIG. 4, the injection stage 50 is formed in a box shape with a bottom that includes the front wall portion 51, right and left side wall portions 55R and 55L extended backwardly from the front wall portion 51, the rear wall portion 52 that connects respective rear ends of the right and left side wall portions 55L and 55R, and a bottom portion 56. Since it has an excellent rigidity, the box shape with a bottom is recommended. However, the injection stage 50 may be formed in a bottomless box shape.

Formed in the front wall portion 51 are a vertical hole 57 into which the material introducing member (see FIG. 3, reference numeral 40) is fitted from the upper side, and a horizontal hole 58 into which the heating cylinder (see FIG. 2, reference numeral 27) is fitted horizontally.

Furthermore, the injection stage 50 includes a second heat medium passage 59 through which the heat medium having undergone the temperature control flows.

The second heat medium passages 59 includes, for example, a medium inlet 59a, a downflow passage 59b, a horizontal passage 59c, and an upflow passage 59d all provided in the front wall portion 51, a horizontal passage 59e provided in the one side wall portion 55R, a downflow passages 59f, a horizontal passage 59g, an upflow passage 59h and a medium outlet 59i all provided in the rear wall portion 52. Note that an exchange between the inlet and the outlet, or a change in the structure of the passage can be made as appropriate.

The injection stage 50 is kept at a substantially equal temperature to that of the heat medium having undergone the temperature control by such a second heat medium passage 59.

Since the injection stage 50 employs a simple structure, it can be formed by casting (including a cast steel). By making complicated machining processes concentrated to the material introducing member 40 such that the recess 44 is formed by cutting and machining in the material introducing member 40 as described with reference to FIG. 3, machining processes to the injection stage 50 can be reduced.

Figure 5A:
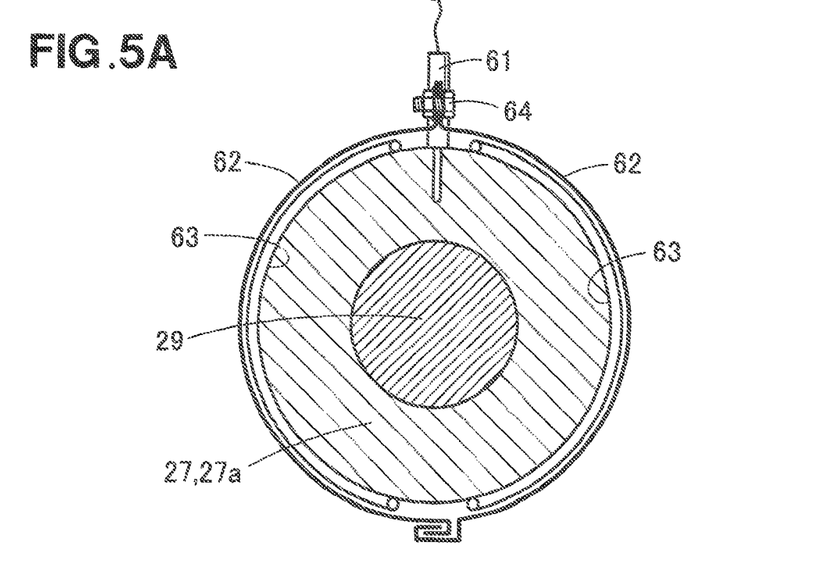
FIG. 5 is a cross-sectional view taken along a line 5A-5A in FIG. 2.

As illustrated in FIG. 5A, a temperature detector 61 like a thermocouple, a heater 62, and cooling jackets 63 are attached to a tail portion 27a of the heating cylinder 27.

Figure 5B:
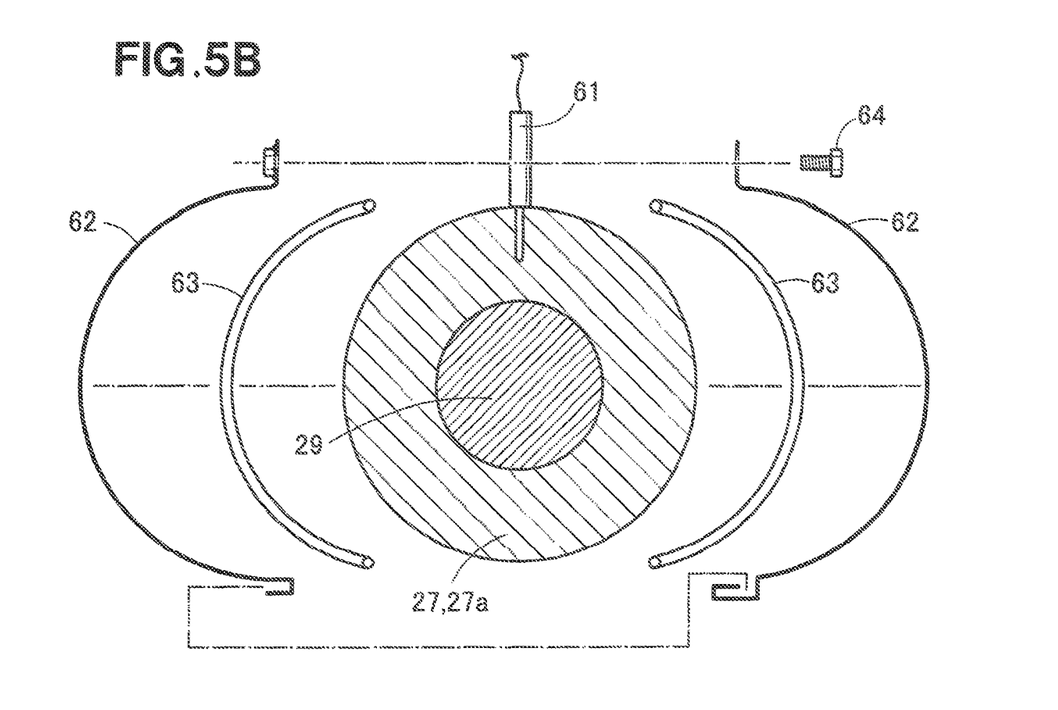

As illustrated in FIG. 5B, the cooling jacket 63 is a hollow body with a half-moon cross sectional shape, and has an interior divided by a wall. The two cooling jackets 63 are attached to the tail portion 27a of the heating cylinder 27, the heater 62 covers the outer circumferences thereof, and the heater 62 is fastened to the heating cylinder 27 by a bolt 64. This attachment work can be carried out by utilizing a top opening illustrated in FIG. 4.

As illustrated in FIG. 2, when the injection process completes, the first groove 29a of the screw 29 is located right under the material introducing member 40. In contrast, when the plasticization and measurement process completes, the first groove 29a of the screw 29 is located between the front wall portion 51 and the rear wall portion 52.

If an electric current is not caused to flow through the heater 62, when the plasticization and measurement process completes, the nearby location to the first groove 29a of the screw 29 is cooled by the low-temperature injection stage 50, thus becoming a low temperature.

The low-temperature first groove 29a reaches right under the material introducing member 40 when the injection process completes, and receives the resin material at this position. Although the resin material is preheated, it is cooled near the low-temperature first groove 29a, and thus an insufficient plasticization may occur.

In contrast, according to the present disclosure, the nearby portion to the first groove 29a located between the front wall portion 51 and the rear wall portion 52 can be heated to an appropriate temperature by allowing the electric current to flow through the heater 62. Consequently, the preheated resin material passes through the first groove 29a while maintaining such a temperature.

A temperature control during a continuous operation is executed by the heater 62. A coolant is supplied to the cooling jackets 63 when the continuous operation is terminated (e.g., when the production process completes or at the time of abnormal stop). An aimed temperature can be changed as appropriate.

Figure 6:
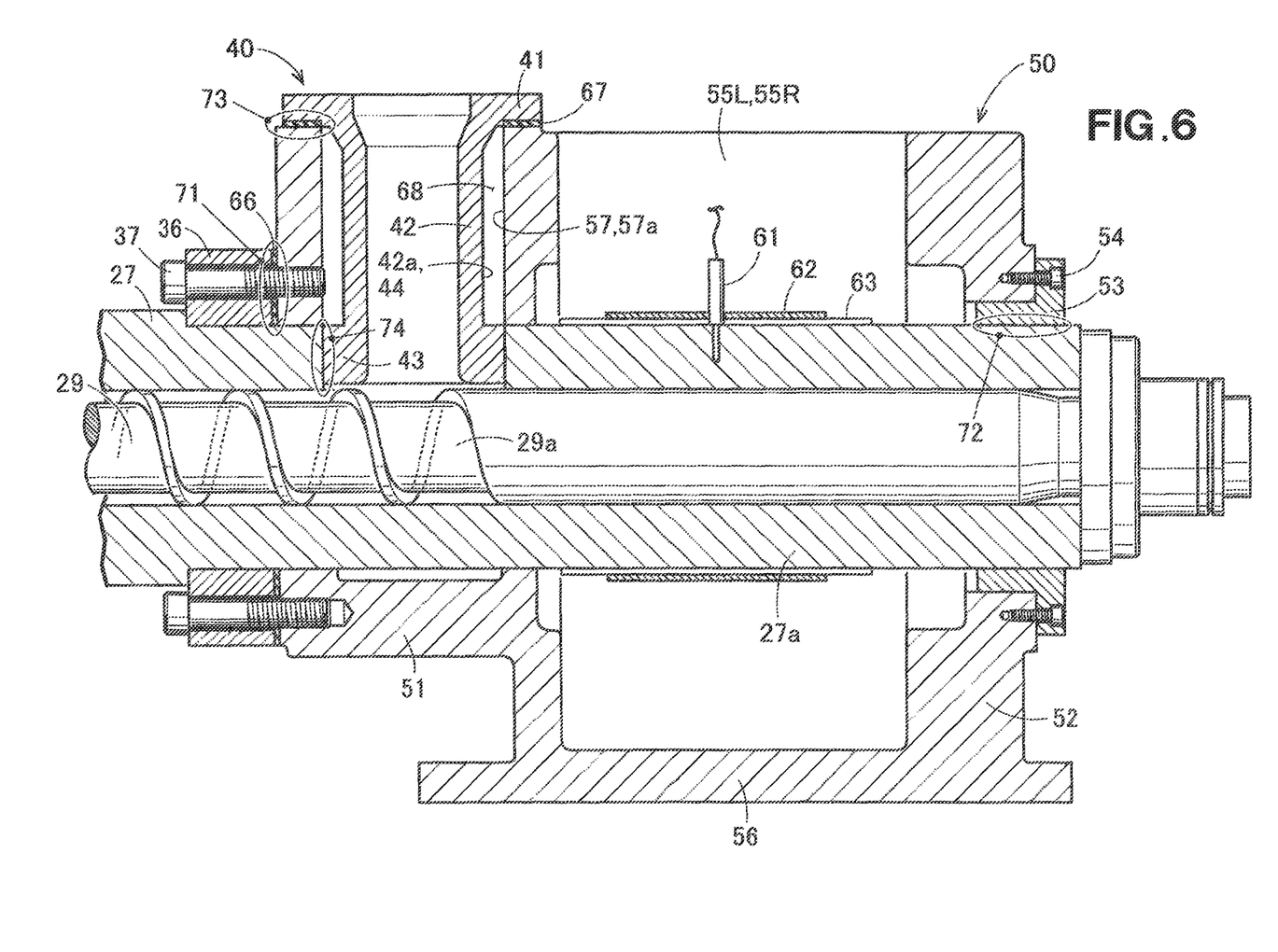
FIG. 6 is a diagram for describing an action of the injection stage.

As illustrated in FIG. 6, it is desirable to place a heat insulating member 66 between the ring member 36 and the injection stage 50. Moreover, it is desirable to place a gasket 67 between the flange portion 41 of the material introducing member 40 and the injection stage 50. Respective heat transfer rates of the heat insulating member 66, the gasket 67, and other components will be shown below.

TABLE 1

| Name | Reference Numeral | Material | Heat transfer rate |
| --- | --- | --- | --- |
| Screw | 29 | Chrome molybdenum steel (SCM) | 43 W/mK |
| Heating Cylinder | 27 | Aluminum chrome molybdenum, steel (SACM) | 43 W/m/K |
| Injection Stage | 50 | Spherical graphite cast iron (FCD) | 35 W/mK |
| Material Introducing Member | 40 | SC steel (S45C) | 43 W/mK |
| L-shaped Cross-sectional Component | 53 | Stainless steel (SUS 304) | 16 W/mK |
| Heat Insulating Member | 66 | Glass-fiber-containing phenol resin | 0.3 W/mK |
| Gasket | 67 | Stainless steel (SUS 304) | 16 W/mK |

The heat transfer rate of the injection stage 50 is 35 W/mK.

The heat transfer rate of the component 53 with an L-shaped cross section is 16 W/mK, and is lower than the heat transfer rate of the injection stage 50.

The heat transfer rate of the heat insulating member 66 is 0.3 W/mK, and is sufficiently lower than the heat transfer rate of the injection stage 50.

The heat transfer rate of the gasket 67 is 16 W/mK, and is lower than the heat transfer rate of the injection stage 50.

Example temperatures of the major components will be shown below.

TABLE 2

| Name | Reference Numeral | Example Temperature |
| --- | --- | --- |
| Heating Cylinder | 27 | 200° C. |
| Injection Stage | 50 | 30° C. |
| Material Introducing Member | 40 | 60° C. |

The heating cylinder 27 is, for example, 200° C. although a preset temperature changes depending on the kind of the resin material.

The temperature of the injection stage 50 is, for example, 30° C.

The temperature of the material introducing member 40 is, for example, 60° C.

In FIG. 6, a heat transfer (heat transmission) from the heating cylinder 27 to the injection stage 50, a heat transfer from the material introducing member 40 to the injection stage 50, and a heat transfer from the heating cylinder 27 to the material introducing member 40 will be discussed.

Heat Transfer from Heating Cylinder 27 to Injection Stage 50

Primary heat transfer portions are a first heat transfer portion 71 (an area between the ring member 36 at the heating-cylinder-27 side and the front wall portion 51 of the injection stage 50), and a second heat transfer portion 72 (a portion between the heating cylinder 27 and the component 53 with an L-shaped cross section).

An amount of heat transfer is proportional to a heat transfer rate. The heat transfer rate of the heat insulating member 66 that is a primary portion of the first heat transfer portion 71 is quite small, and the heat transfer rate of the component 53 with an L-shaped cross section that is a primary portion of the second heat transfer portion 72 is below the half of the heat transfer rate of the injection stage 50.

Consequently, the heat transfer from the heating cylinder 27 to the injection stage 50 is quite small, and the heating cylinder 27 is not cooled by the injection stage 50, and is merely and slightly cooled even if it is to be cooled.

Heat Transfer from Material Introducing Member 40 to Injection Stage 50

A space between a surface 57a of the vertical hole 57 of the front wall portion 51 and an outer circumference 42a of the cylindrical portion 42 of the material introducing member 40 is separated by an insulating air layer 68 with a predetermined thickness. Since it is separated, although a heat transfer by air convection occurs, direct heat transfer does not occur. Note that although the predetermined thickness of the insulating air layer 68 is set as appropriate in accordance with the dimension of the injection device 20, a range between 5 mm and 15 mm is suitable.

A heat transfer occurs by air that circulates in the insulating air layer 68. An amount of heat transfer by a heat transfer by a heat carrier that is circulating air is remarkably small in comparison with a heat transfer that is directly transferred from a solid body to a solid body.

Hence, a primary heat transfer portion for a heat transfer from the material introducing member 40 to the injection stage 50 is merely a third heat transfer portion 73 (an area between the flange portion 41 of the material introducing member 40, and the front wall portions 51 of the injection stage 50).

A heat transfer rate of the gasket 67 that is a primary portion of the third heat transfer portion 73 is less than the half of the heat transfer rate of the injection stage 50.

Consequently, a heat transfer from the material introducing member 40 to the injection stage 50 is quite small, and the material introducing member 40 is not cooled by the injection stage 50, and is merely and slightly cooled even if it is to be cooled.

Heat Transfer from Heating Cylinder 27 to Material Introducing Member 40

A primary heat transfer portion is merely a fourth heat transfer portion 74 (an area between the heating cylinder 27 and the collar portion 43 of the material introducing member 40).

When, for example, the heating cylinder 27 is 200° C. and the material introducing member 40 is 60° C., a heat transfer from the heating cylinder 27 to the collar portion 43 through the fourth heat transfer portion 74 occurs. Consequently, the temperature of the material introducing member 40 becomes close to the temperature of the heating cylinder 27.

As described above, because of the heat insulating action by the heat insulating air layer 68 provided between the material introducing member 40 and the injection stage 50, the material introducing member 40 is not likely to be cooled by the injection stage 50 and it is merely and slightly cooled even if it is to be cooled. Accordingly, the material introducing member 40 is kept at a predetermined temperature, and the preheated resin material at an appropriate temperature is introduced in the heating cylinder 27.

Note that although the second heat medium passage 59 is provided in the injection stage 50, the heat medium having undergone the temperature control is caused to flow through so as to maintain the temperature around 30° C. in the embodiment, for the purpose of simplification of the structure and cost down thereof, the second heat medium passage 59 may be eliminated.

However, the injection stage 50 may gradually become a high temperature upon receiving heat from the heating cylinder 27. A change in the temperature of the injection stage 50 gives an adverse effect to the temperature control on the heating cylinder 27 and on the material introducing member 40.

Like the embodiment, when the second heat medium passage 59 is provided in the injection stage 50, and the heat medium having undergone the temperature control is caused to flow through it, the temperature control on the heating cylinder 27 and on the material introducing member 40 can be performed successfully.

Next, modified examples according to the present disclosure will be described.

Figure 7:
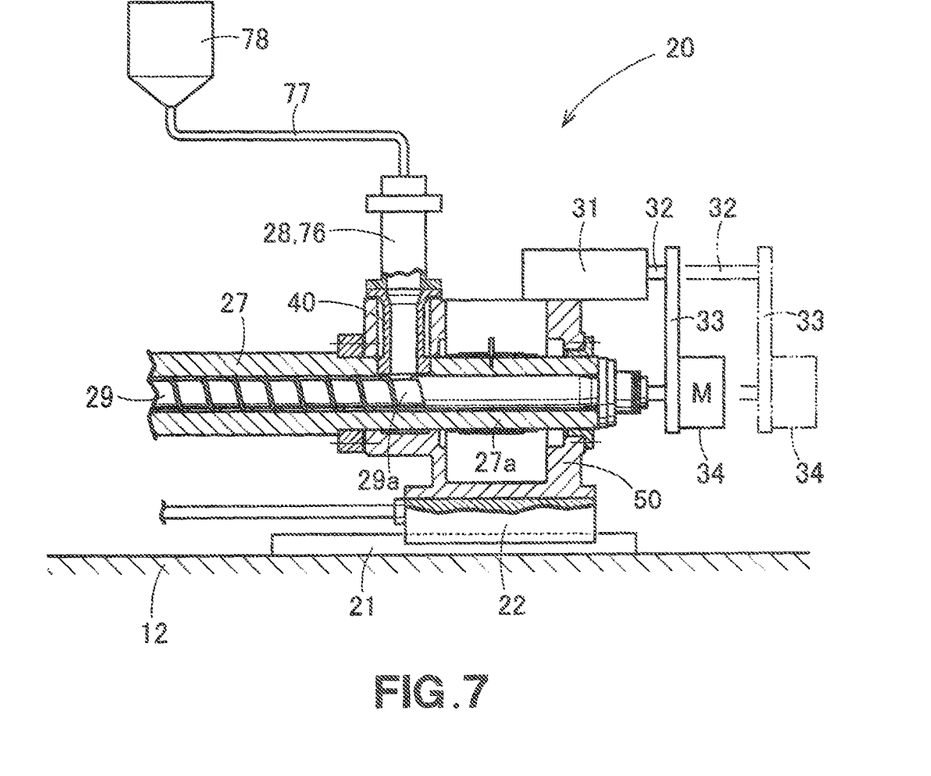
FIG. 7 is a diagram for describing a material supplying unit according to another embodiment.

In FIG. 7, the same component as that in FIG. 1 will be denoted by the same reference numeral in FIG. 1, and the detailed description thereof will be omitted.

As illustrated in FIG. 7, the material supplying unit 28 may be a cylindrical joint portion 76. The joint portion 76 is connected to a hopper 78 with a preheating function through a preheated material feeding pipe 77. The resin material that is preheated by the hopper 78 with the preheating function is supplied to the material introducing member 40 through the preheating material feeding pipe 77 and through the joint portion 76.

The material supplying unit 28 may be, in addition to the hopper (see FIG. 1, reference numeral 38), the joint portion 76, the form and structure are optional, and are not limited to any particular forms and structures.

In FIG. 8, the same component as that in FIG. 2 will be denoted by the same reference numeral in FIG. 2, and the detailed description thereof will be omitted.

Figure 8A:
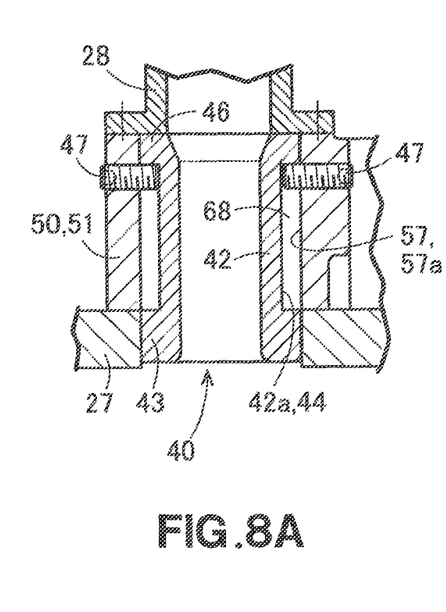
FIG. 8 is a diagram for describing a material introducing member according to another embodiment.

As illustrated in FIG. 8A, the material introducing member 40 has the flange portion 41 which is described with reference to FIG. 2 and which is omitted, and completely fitted in the vertical hole 57. Consequently, the material supplying unit 28 can be directly mounted on the front wall portion 51 of the injection stage 50. Note that a second collar portion 46 may be provided at the upper part of the cylindrical portion 42, and the second collar portion 46 may be supported by bolts 47 (e.g., hex socket screws) extended from the front wall portion 51.

Figure 8B:
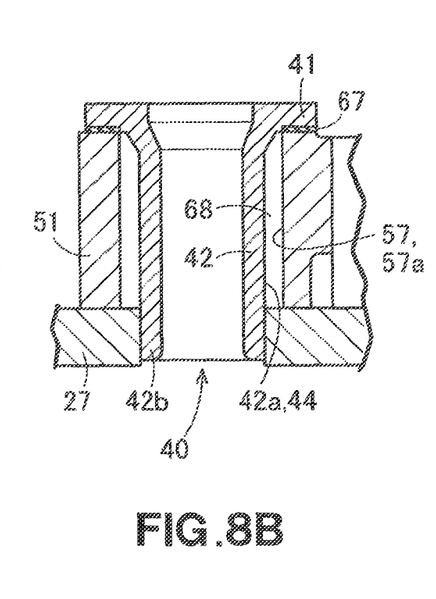

Moreover, as illustrated in FIG. 8B, the material introducing member 40 may have the collar portion 43 as described with reference to FIG. 2 omitted. In this case, the material introducing member 40 includes the cylindrical portion 42 that extends along the vertical hole 57, and the flange portion 41 integrally formed at the upper part of the cylindrical portion 42. A lower part 42b of the cylindrical portion 42 is directly in contact with the heating cylinder 27. Note that the cylindrical portion 42 that extends along the vertical hole 57 means that the lengthwise center axis of the cylindrical portion 42 is aligned with the lengthwise axis of the vertical hole 57.

Figure 8C:
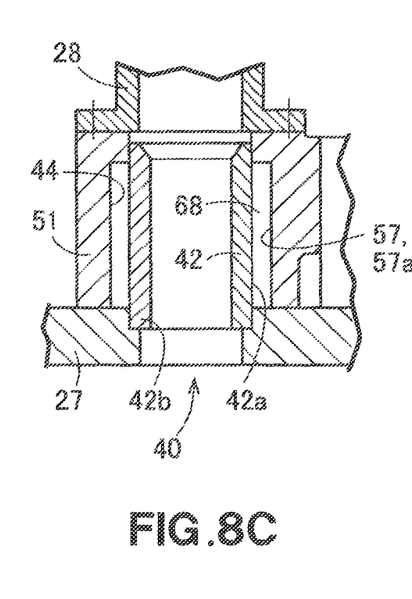

Moreover, as illustrated in FIG. 8C, the material introducing member 40 may include only the cylindrical portion 42 that extends along the vertical hole 57. In this case, the insulating air layer 68 is ensured by providing the recess 44 in the front wall portion 51 of the injection stage 50. The material introducing member 40 in a simply cylindrical shape is supported by the heating cylinder 27 so as to allow such a member to expand upwardly.

As described above, regarding the material introducing member 40, although the cylindrical portion 42 that extends along the vertical hole 57 is an essential element, it is optional whether or not the cylindrical portion 42 is provided with the collar portion 43, the second collar portion 46 and/or the flange portion 41.

Moreover, the recess 44 provided to ensure the heat insulating air layer 68 may be formed in either one of the material introducing member 40 or the front wall portion 51, and may be formed in both the material introducing member 40 and the front wall portion 51. When formed in both the components, the depth of each recess 44 can be reduced to the half.

Note that the injection device 20 of the present disclosure is applicable to both a horizontal-type injection molding apparatus that has a horizontal injection axis, and a vertical-type injection molding apparatus that has a vertical injection axis.

INDUSTRIAL APPLICABILITY

The present disclosure is suitable for an injection device to which a preheated resin material is applied.

Reference Signs List

20 Injection device
27 Heating cylinder
27a Tail portion of heating cylinder
28 Material supplying unit
29 Screw
35 Bolt hole
36 Ring member
37 Bolt 40 Material introducing member
41 Flange portion
42 Cylindrical portion
42a Outer circumference of cylindrical portion
42b Lower part of cylindrical portion
44 Recess
45 First heat medium passage
50 Injection stage
51 Front wall portion
52 Rear wall portion
53 Component with lower heat transfer rate than injection stage (component with L-shaped cross section)
57 Vertical hole
57a Surface of vertical hole
59 Second heat medium passage
61 Temperature detector
62 Heater
63 Cooling jacket
66 Heat insulating member
67 Gasket
68 Heat insulating air layer

The invention claimed is:

1. An injection device comprising:
a heating cylinder;
a screw disposed in the heating cylinder so as to be rotatable and movable in an axial direction;
an injection stage supporting the heating cylinder;
a material supplying unit that supplies a resin material to the heating cylinder; and
a material introducing member which is disposed between the material supplying unit and the heating cylinder and which introduces the resin material from the material supplying unit to the heating cylinder, the material introducing member extending through a vertical hole provided in the injection stage with a lower part thereof in abutting contact with the heating cylinder, the material introducing member having a cylindrical portion extending though the vertical hole and a smooth outer circumferential surface, a first heat medium passage extending inside a sidewall of the cylindrical portion for flowing therethrough a temperature-controlled heat medium, and a heat-insulating air space formed between the smooth outer circumferential surface of the cylindrical portion and a circumferential surface of the vertical hole.

2. The injection device according to claim 1, wherein:
the injection stage comprises a cast metal member; and
the material introducing member comprises a cut-and-machined metal member.

3. The injection device according to claim 1, wherein the injection stage includes a second heat medium passage extending inside a wall portion thereof for flowing therethrough a temperature-controlled heat medium.

4. The injection device according to claim 1, wherein:
the injection stage has a box shape having spaced-apart front and rear wall portions;
a tail portion of the heating cylinder is supported by the front wall portion and by the rear wall portion; and
in a common space between the front wall portion and the rear wall portion, a temperature detector, a heater and a cooling jacket are attached to the tail portion of the heating cylinder.

5. The injection device according to claim 4, wherein:
the tail portion of the heating cylinder is supported by the rear wall portion through a member that has a lower heat transfer rate than a heat transfer rate of the injection stage;
the tail portion of the heating cylinder is fastened to the front wall portion by a bolt through a ring member provided with a bolt hole; and
a heat insulating member is held between the ring member and the front wall portion.

6. The injection device according to claim 5, wherein:
an upper part of the material introducing member has a flange portion; and
a gasket that has a lower heat transfer rate than a heat transfer rate of the injection stage is held between the flange portion and the injection stage.

7. The injection device according to claim 4, wherein:
an upper part of the material introducing member has a flange portion; and
a gasket that has a lower heat transfer rate than a heat transfer rate of the injection stage is held between the flange portion and the injection stage.

8. The injection device according to claim 3, wherein:
an upper part of the material introducing member has a flange portion; and
a gasket that has a lower heat transfer rate than a heat transfer rate of the injection stage is held between the flange portion and the injection stage.

9. The injection device according to claim 2, wherein:
an upper part of the material introducing member has a flange portion; and
a gasket that has a lower heat transfer rate than a heat transfer rate of the injection stage between the flange portion and the injection stage.

10. The injection device according to claim 1, wherein:
an upper part of the material introducing member has a flange portion; and
a gasket that has a lower heat transfer rate than a heat transfer rate of the injection stage is held between the flange portion and the injection stage.

11. The injection device according to claim 1, wherein the first heat medium passage extends up and down the length of the cylindrical portion.

12. The injection device according to claim 1, wherein an upper part of the material introducing member has a flange, the flange being supported by the injection stage with a gasket interposed therebetween, the gasket having a heat transfer rate less than half the heat transfer rate of the injection stage.

13. The injection device according to claim 12, wherein the lower part of the material introducing member has a collar in abutting contact with the heating cylinder, the heat-insulating air space being defined by the outer circumferential surface of the cylindrical portion, the circumferential surface of the vertical hole, the flange and the collar.

14. The injection device according to claim 1, wherein the heat-insulating air space has an annular shape.

15. The injection device according to claim 1, wherein the injection stage has a generally box shape having spaced-apart front and rear wall portions interconnected by opposed sidewall portions, a horizontal hole extending horizontally through the front and rear walls and through which extends a rear portion of the heating cylinder, the vertical hole being located forward of the front wall and aligned with an opening in the heating cylinder through which the resin material is introduced into the heating cylinder.

16. The injection device according to claim 15, further including a second heat medium passage extending inside the wall portions of the injection stage for flowing therethrough a temperature-controlled heat medium.

* * * * *